United States Patent
Willemen

(10) Patent No.: US 9,272,351 B2
(45) Date of Patent: Mar. 1, 2016

(54) DROSS REMOVAL

(75) Inventor: Lambertus Petrus Christinus Willemen, Dorst (NL)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/604,886

(22) Filed: Sep. 6, 2012

(65) Prior Publication Data

US 2012/0325899 A1 Dec. 27, 2012

Related U.S. Application Data

(60) Division of application No. 12/715,187, filed on Mar. 1, 2010, which is a continuation of application No. 12/107,172, filed on Apr. 22, 2008, now abandoned.

(51) Int. Cl.

| | | |
|---|---|---|
| *B23K 31/02* | (2006.01) | |
| *B23K 1/08* | (2006.01) | |
| *B23K 3/08* | (2006.01) | |
| *B23K 1/20* | (2006.01) | |
| *B23K 3/06* | (2006.01) | |
| *C22B 3/00* | (2006.01) | |
| *C22B 13/02* | (2006.01) | |
| *C22B 7/04* | (2006.01) | |
| *C22B 21/00* | (2006.01) | |

(52) U.S. Cl.
CPC ... *B23K 3/08* (2013.01); *B23K 1/08* (2013.01); *B23K 1/085* (2013.01); *B23K 1/206* (2013.01); *B23K 3/0646* (2013.01); *B23K 3/0653* (2013.01); *C22B 7/04* (2013.01); *C22B 13/025* (2013.01); *C22B 13/045* (2013.01); *C22B 21/0069* (2013.01)

(58) Field of Classification Search
CPC .. B23K 3/0653; B23K 2201/42; B23K 1/085; B23K 3/0646; B23K 1/08; B23K 1/206; C22B 7/04; C22B 13/025; C22B 13/045; C22B 21/0069
USPC ............................................. 228/37, 256, 260
See application file for complete search history.

(56) References Cited

U.S. PATENT DOCUMENTS

| | | | |
|---|---|---|---|
| 2,165,342 A | | 7/1939 | Campbell, Jr. |
| 2,937,757 A | * | 5/1960 | Pisani ........................... 210/526 |
| 4,007,119 A | | 2/1977 | Antonevich |
| 4,256,252 A | | 3/1981 | Huppunen et al. |
| 4,332,373 A | | 6/1982 | Huppunen et al. |
| 4,375,271 A | | 3/1983 | Tsuchikura |

(Continued)

FOREIGN PATENT DOCUMENTS

| | | |
|---|---|---|
| CN | 2037659 U | 5/1989 |
| CN | 1383956 A | 12/2002 |

(Continued)

OTHER PUBLICATIONS

Computer english translation of JP 2006198633 A.*

(Continued)

*Primary Examiner* — Erin Saad
(74) *Attorney, Agent, or Firm* — The Small Patent Law Group, LLC; Christopher R. Carroll

(57) ABSTRACT

This invention relates to for devices, systems, and methods for separating dross, carried by molten solder, into solder and residue.

21 Claims, 5 Drawing Sheets

(56) References Cited

U.S. PATENT DOCUMENTS

| | | | |
|---|---|---|---|
| 4,496,394 | A | 1/1985 | Bowers |
| 4,804,168 | A | 2/1989 | Otsuka et al. |
| 5,509,598 | A | 4/1996 | Nayar et al. |
| 5,846,481 | A * | 12/1998 | Tilak .............................. 266/217 |
| 6,146,443 | A * | 11/2000 | Eckert ............................ 75/671 |
| 6,578,752 | B1 | 6/2003 | Willemen |
| 6,592,017 | B2 | 7/2003 | Morris et al. |
| 6,655,574 | B2 | 12/2003 | Schouten et al. |
| 6,666,370 | B2 | 12/2003 | McDonald |
| 2002/0162780 | A1 | 11/2002 | Ogawa |
| 2004/0011851 | A1 | 1/2004 | Howell et al. |
| 2005/0167075 | A1 | 8/2005 | Eckert |

FOREIGN PATENT DOCUMENTS

| | | | |
|---|---|---|---|
| JP | 2005515079 | A | 5/2005 |
| JP | 2006198633 | A * | 8/2006 |
| WO | 02/062515 | A2 | 8/2002 |

OTHER PUBLICATIONS

Cut defintion; dictionary.com.*
Dross definition; dictionary.com.*
Residue definition; dictionary.com.*
PCT/US2009/041418, Notification of Transmittal of the Int'l Search Report and the Written Opinion of the Int'l Searching Authority, Dec. 4, 2009.

* cited by examiner

DROSS REMOVAL

RELATED PATENT APPLICATIONS

This application is a divisional of and claims priority from U.S. patent application Ser. No. 12/715,187 filed on Mar. 1, 2010, which is a continuation of U.S. patent application Ser. No. 12/107,172 filed on Apr. 22, 2008, now abandoned.

TECHNICAL FIELD

This invention relates to devices, systems, and methods for handling molten solder, and more particularly to devices, systems, and methods for separating dross, carried by molten solder, into solder and residue.

BACKGROUND

Dross is a byproduct of soldering processes, such as wave soldering. Dross includes oxides of the metals of which the solder is composed, contaminants which come from flux and/or other agents used in the soldering process, and some usable solder. In particular, during oxidation, nuclei of solder are formed which are enveloped by oxides. Clusters of such units form the dross. Dross can disrupt the soldering process.

Dross has a density that is less than that of solder so that dross typically floats on molten solder. Known methods of dealing with dross include scooping the dross off the surface of molten solder. However, when the dross is scooped away, not only are metal oxides and contaminants removed, but also some usable solder.

SUMMARY

The invention is based, in part, on the discovery that a gas can be injected into molten solder to aid in the separation of dross into reusable solder and a residue.

In general, the invention features systems for separating dross into reusable solder and a residue. The systems include a vessel configured to receive and contain molten solder, and a gas injection circuit arranged to inject one or more gases into molten solder disposed within the vessel.

In some implementations, the gas injection circuit is configured to inject the gas into the vessel in a region below a surface level of molten solder disposed within the vessel.

In some embodiments, the gas injection circuit comprises one or more gas injection pipes at least partially disposed within the vessel. In some cases, the gas injection pipe is configured to deliver the gas into the vessel. The gas injection circuit can also include a gas source in fluid communication with the gas injection pipe. The gas injection pipe can be configured to deliver gas from the gas source into the vessel. In some examples, the gas injection pipe is at least partially disposed within the vessel in a position below a surface level of molten solder disposed within the vessel.

In some implementations, the gas injection circuit includes a gas source, and a gas injection pipe at least partially disposed within the vessel. The gas injection pipe can include a first opening in fluid communication with the gas source, and one or more apertures disposed within the vessel and in fluid communication with the first opening. The gas injection pipe can be arranged to convey one or more pressurized gases from the gas source to the separating vessel.

In some embodiments, the systems can also include at least one knife extending at least partially into the vessel and arranged to contact a flow of molten solder disposed within the vessel. The at least one knife can be mounted for movement relative to the vessel thereby to cut through dross carried by molten solder within the vessel. In some cases, the gas injection circuit includes a plurality of gas injection pipes disposed within the separating vessel and arranged around the at least one knife. The plurality of gas injection pipes can be configured to deliver gas into molten solder within the separating chamber. In some examples, the gas injection pipes are substantially parallel to a motion axis of the at least one knife.

In another aspect, the invention features wave soldering systems. The systems include a separating vessel configured to receive and support molten solder, a gas injection circuit arranged to inject one or more gases into molten solder disposed within the separating vessel, a soldering vessel, an inlet configured to deliver a flow of molten solder from the soldering vessel to the separating vessel for removal of dross from the molten solder, and an outlet configured to deliver a flow of molten solder from the separating vessel to the soldering vessel.

In some implementations, the gas injection circuit includes a gas source, and one or more gas injection pipes in fluid communication with the gas source and at least partially disposed within the separating vessel. The one or more gas injection pipes can be arranged to deliver a gas from the gas source into the separating vessel. In some cases, the one or more gas injection pipes are at least partially disposed within the separating vessel in a position below a surface level of molten solder disposed within the separating vessel.

In another aspect, the invention features methods of separating dross floating on solder into solder and residue. The methods include delivering molten solder including dross into a first vessel, and injecting a gas into the molten solder in the vessel to separate residue from the molten solder.

In some embodiments, injecting the gas into the molten solder includes delivering a gas from a gas source to a gas injection pipe at least partially disposed within the first vessel. In some implementations, injecting the gas into the molten solder includes delivering gas into the first vessel in a region below a surface level of the molten solder. In some embodiments, injecting the gas into the molten solder comprises delivering nitrogen gas from a gas source into the first vessel. In some implementations, the methods can also include cutting through dross carried by the molten solder.

In some embodiments, the methods can include delivering the molten solder with the residue removed therefrom from the first vessel to a second vessel. Delivering molten solder into the separating vessel can include delivering molten solder including dross from the first vessel into the second vessel.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

The new devices, systems, and methods can be used for separating dross carried by molten solder into recoverable solder and a residue.

System Overview

Figure 1:
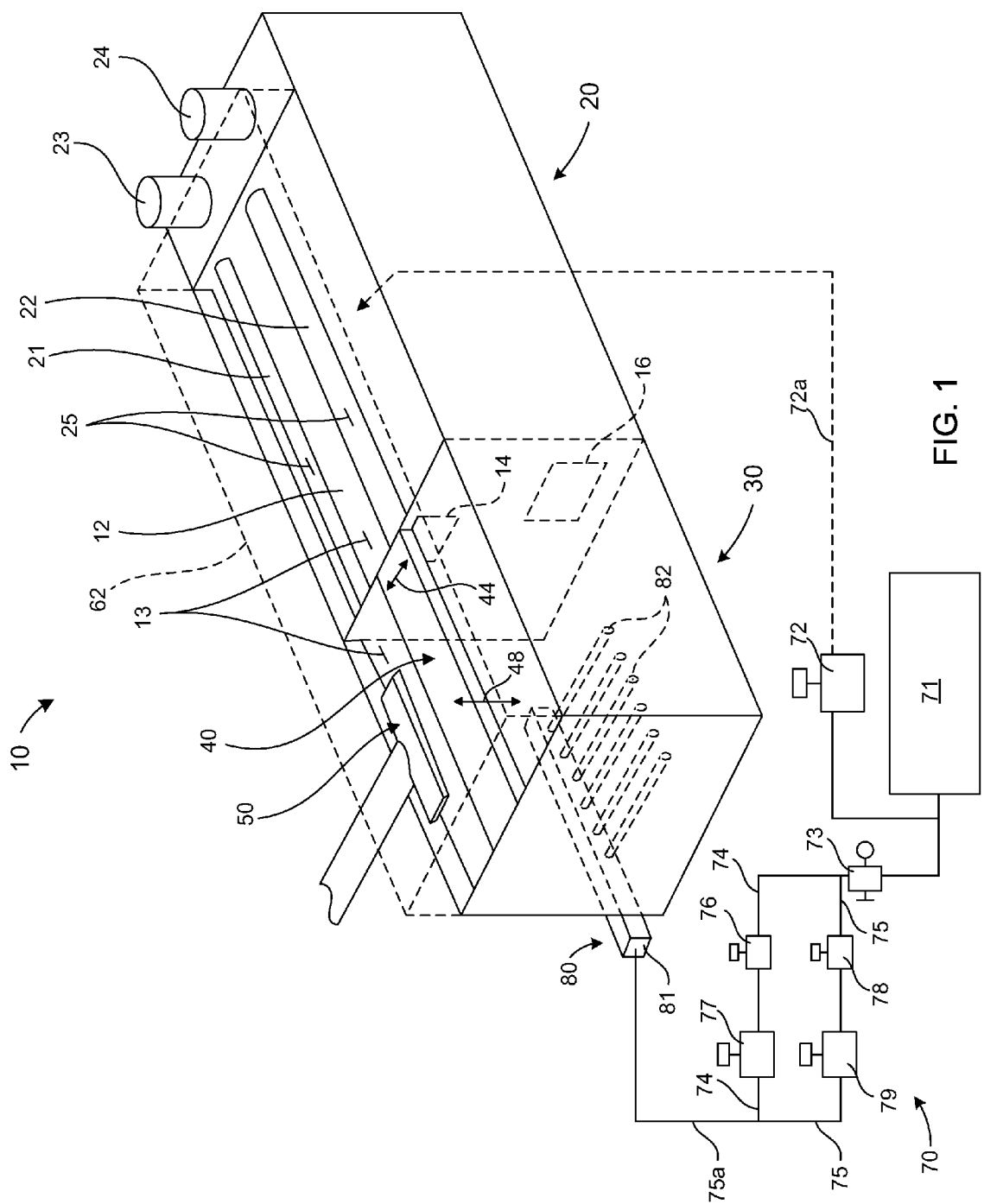
FIG. 1 is a perspective view of a wave soldering system.

Referring to FIG. 1, a wave soldering system 10 includes a soldering vessel 20 for soldering parts, and separating vessel 30 for the separation of dross created as a result of the soldering process. As shown in FIG. 1, the soldering vessel 20 includes first and second soldering towers 21, 22. First and second solder pumps 23, 24 are connected to the first and second soldering towers 21, 22, respectively. The first and second solder pumps 23, 24 pump molten solder 12 to the first and second soldering towers 21, 22 thereby to generate solder waves 25. Objects for soldering, such as printed wiring boards, can be carried above the soldering vessel 20 so that the solder waves 25 contact and thereby solder the objects.

The separating vessel 30 is provided for separating dross into solder and residue. The separating vessel 30 is in fluid communication with the soldering vessel 20 via an inlet conduit 14 and an outlet conduit 16. The inlet conduit 14 allows solder 12, along with dross which generally floats on the solder 12, to enter the separating vessel 30 from the soldering vessel 20. Due to the law of communicating vessels, the liquid level in the separating vessel 30 will be the same as that in the processing vessel 20. The outlet conduit 16 allows for molten solder, with residue having been removed therefrom, to be returned back to the soldering vessel 20 from the separating vessel 30.

Figure 2:
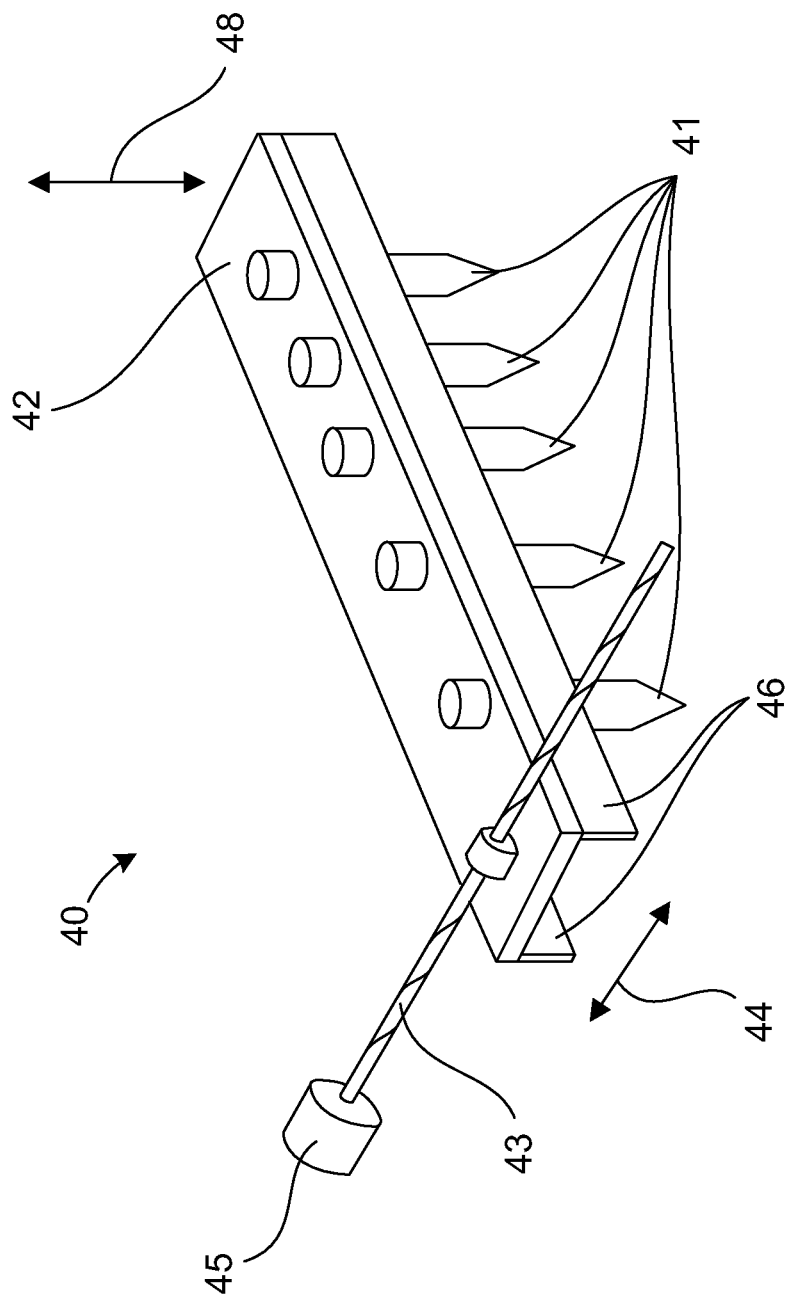
FIG. 2 is a perspective view of a cutting unit.

The separating vessel 30 includes a cutting unit 40, a suction apparatus 50, and a gas injection circuit 70. Referring to FIG. 2, the cutting unit 40 includes one or more knives 41 (five shown), a support 42, and a linear drive assembly 43. The support 42 is arranged above the separating vessel 30 and the knives 41 are mounted to the support 42 such that the knives 41 extend at least partially into the separating vessel 30 and into contact with a surface 13 of the molten solder 12 in the separating vessel 30. The support 42 is movable (as indicated by arrow 44) relative to the separating vessel 30 and is driven by the linear drive assembly 43 via a motor 45. As a result of the linear displacement (arrow 44) of the support 42 relative to the separating vessel 30, the knives 41 cut through the dross thereby causing the dross to partially separate into residue and solder. The separated solder can then be returned to the soldering vessel 30 and the residue can be removed from the separating vessel 30.

As shown in FIG. 2, the support 42 can also include one or more plates 46 which skim the residue on the solder surface 13 as the support 42 is moved. In this manner, the plates 46 can be used to displace the residue toward the suction apparatus 50 for removal. In some examples, the cutting unit 40 and/or the plates 40 are also moveable vertically (as indicated by arrow 48) relative to the separating vessel 30. This allows the plates 46 to be moved into and out of contact with the surface 13 of the molten solder 12. In use, with the cutting unit 40 and/or the plates 46 elevated relative to the separating vessel 30 such that the plates 46 are out of contact with the solder 12, and, with the knives 41 extending into the solder 12, the support 42 is displaced in the direction of arrow 44 relative to the solder 12 to break up the dross. After executing a predetermined number of cutting strokes, the cutting unit 40 and/or the plates 46 are lowered relative to the separating vessel 30 such that the plates 46 contact the surface 13 of the solder 12. Then, the support 42 is again displaced in the direction of arrow 44 to cause the plates 46 to urge residue, floating on the surface 13 of the solder 12, towards the suction apparatus 50 for removal.

As shown in FIG. 1, the system 10 can optionally include a cover 62 (shown in dashed lines) that extends over the separating vessel 30 and/or the soldering vessel 20. Covering the separating vessel 30 can allow for better control of air flow through the cyclone 52. Alternatively or additionally, the cover 62 can extend over the soldering vessel 20, and can thereby provide a soldering apparatus suitable for soldering under a low-oxygen environment. For example, a gas not containing oxygen, e.g., nitrogen gas, can be supplied to the environment between the cover 62 and the soldering and/or separating vessels 20, 30 (e.g., via conduit 72a). In such an embodiment, the fan 54 can be used to draw the low-oxygen gas from the separating vessel 30. The low-oxygen gas leaving the fan 54 can then be recovered so that it can be reused.

Gas Injection Circuit

As shown in FIG. 1, the gas injection circuit 70 includes a main source 71, which stores a gas (e.g., an inert gas, e.g., nitrogen) or a mixture of gases. Alternatively, two or more gas sources may be provided. The main source 71 is connected to a main valve 72. The main valve 72 is operable to control a flow of gas, e.g., to the environment between the cover 62 and the soldering and/or separating vessels 20, 30. The main source 71 is also connected to a pressure regulator 73, which maintains a pressure of a gas flow that is delivered from the main source 71 toward a pair of flow paths (e.g., active and bypass flows paths 74, 75). The active flow path 74 includes a first valve 76 and an active flow regulator 77 (e.g., a fixed flow regulator). The bypass flow path 75 includes a second valve 78 and a bypass flow regulator 79 (e.g., a fixed flow regulator). The active and bypass flow paths 74, 75 are in fluid communication via conduit 75a with a gas injection assembly 80 and are configured to convey gas flow from the main source 71, via the pressure regulator 73, to the gas injection assembly 80.

Figure 3A:
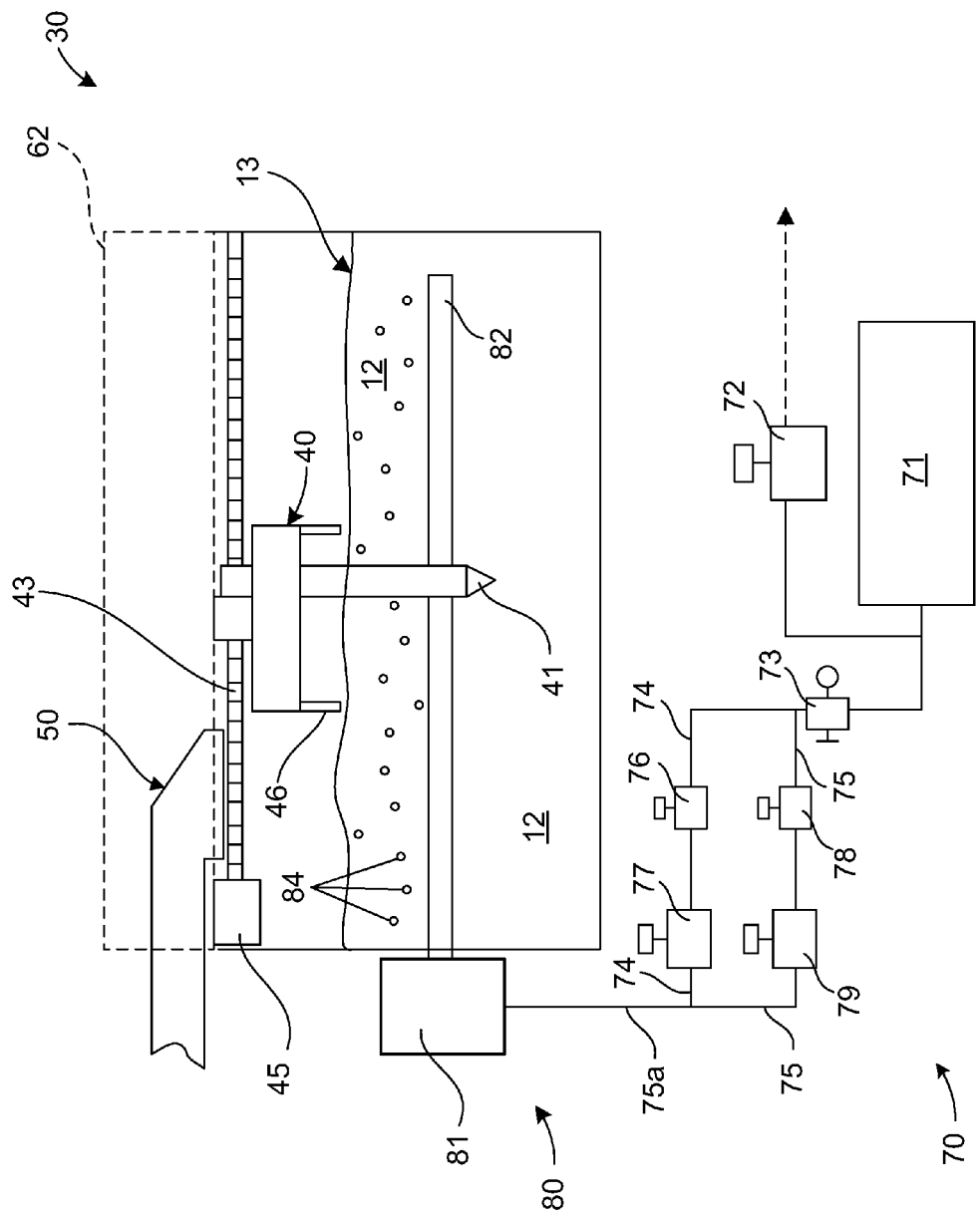
FIGS. 3A and 3B are front and side plan views of a separating vessel with a gas injection circuit.
Figure 3B:
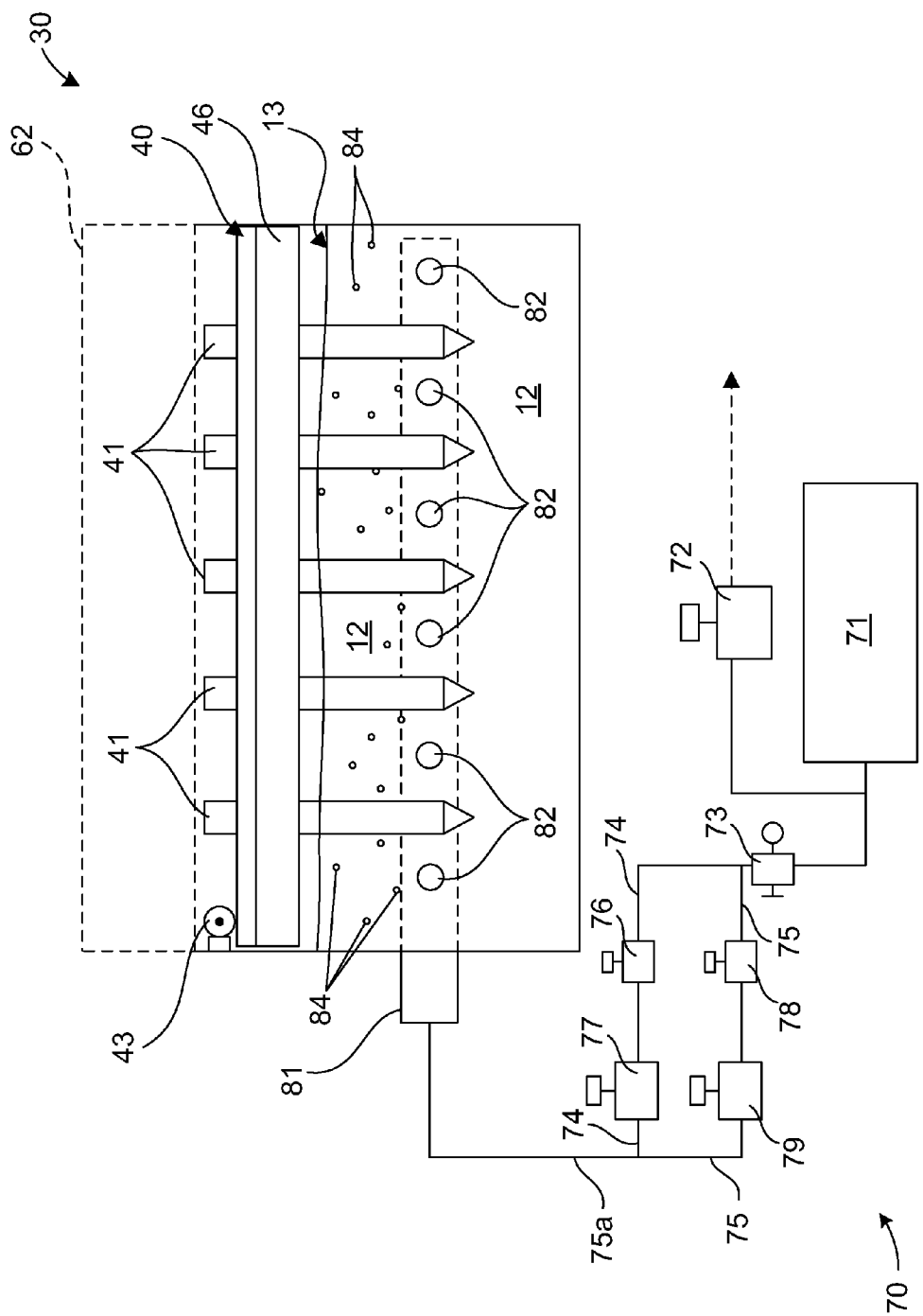

The gas injection assembly 80 includes a manifold 81 and one or more gas injection pipes 82. The manifold 81 distributes the gas flow from the main source 71 to the gas injection pipes 82. Referring to FIGS. 3A and 3B, the gas injection pipes 82 are partially disposed within the separating vessel 30 in a position below a liquid level as defined by surface 13 of molten solder 12 in the separating vessel 30 and are configured to deliver the gas flow into the molten solder 12. The gas injections pipes 82 can be formed of a metal such as titanium or a stainless steel.

Figure 4:
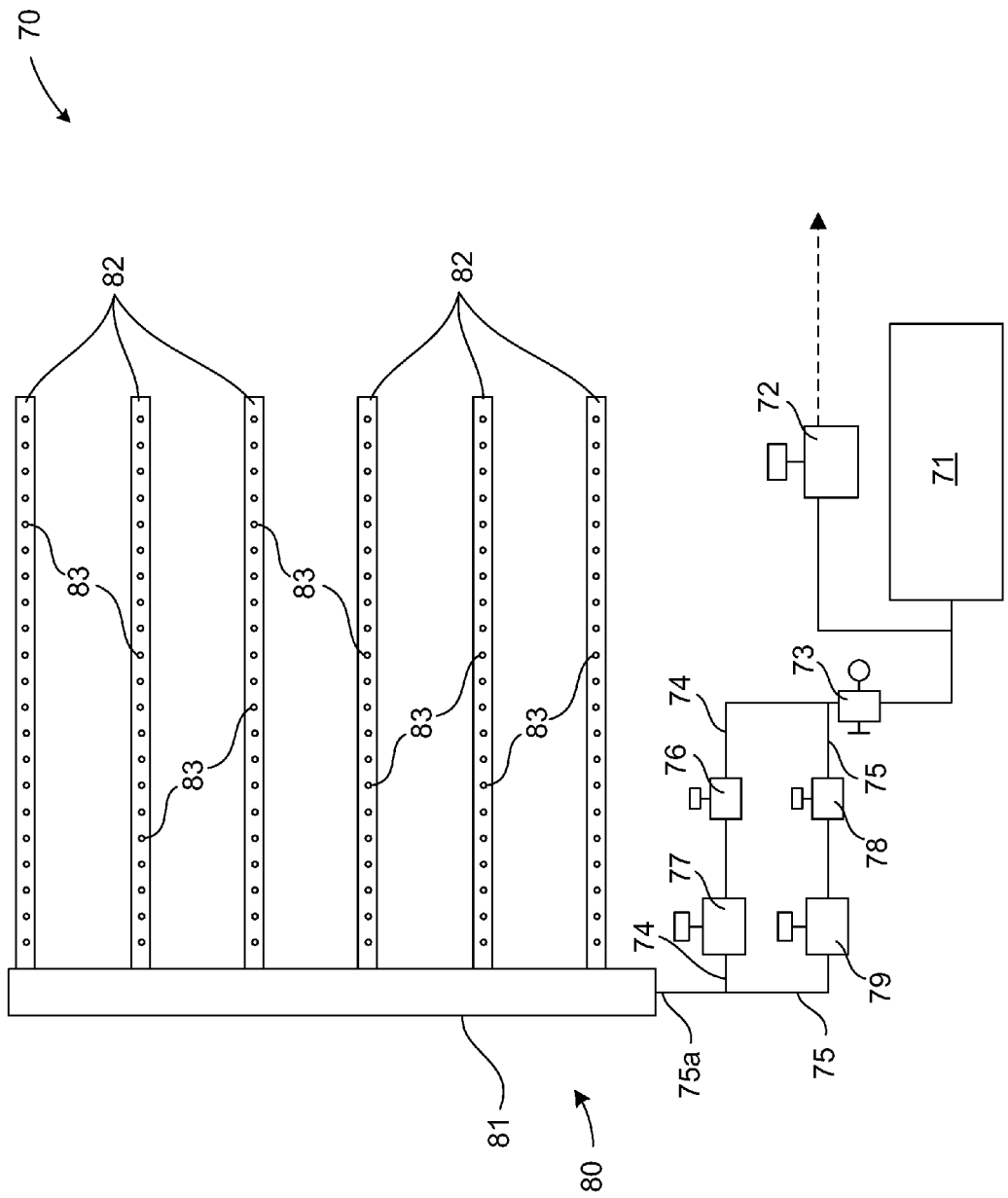
FIG. 4 is a top plan view of a gas injection circuit.

As shown in FIG. 4, the gas injection pipes 82 each include one or more small apertures 83 (e.g., each being about 0.1 mm-0.5 mm in diameter) that are in fluid communication with the manifold 81 and are sized so as to reduce the possibility of the inner side of the pipes 82 with solder 12. As gas from the main source 71 is injected into the gas injection pipes 82, via the manifold 81, the apertures 83 allow the gas to exit the gas injection pipes 82 as bubbles 84 into the solder 12 in the separating vessel 30.

During use, while operating in an active mode, e.g., during a soldering operation, the second valve 78 will be closed to inhibit the flow of gas through the bypass circuit and the first valve 76 will be opened to direct a gas flow through the active flow regulator 77 to provide a substantially continuous flow of gas (e.g., at about 8 L/min) toward the gas injection assembly 80. While operating in a standby mode, e.g., between soldering operations when the system 10 is not in use, the first valve 76 will be closed and the second valve 78 will be opened to direct a gas flow through the bypass flow regulator 79 to provide a substantially continuous gas flow (e.g., from between about 1 L/min and about 4 L/min, e.g., about 2 L/min) to the gas injection assembly 80. In this manner, the bypass flow path 75 functions to inhibit clogging of the pipe apertures 83 when the system 10 is not in use while limiting the consumption of gas.

Methods of Operation

In general, the system operates as follows.

When the soldering vessel 20 is set into operation, the first and second pumps 23, 24 deliver molten solder to the first and second soldering towers 21, 22 to generate solder waves 25. A workpiece for soldering, e.g., a printed wiring board with components for soldering, is conveyed across the soldering vessel 20 to contact the solder waves 25 to solder the workpiece. After the soldering process, the solder 12 from the solder waves 25 flows back into the solder vessel 20. The solder 12, now contaminated with dross, then passes through the inlet conduit 14 into the separating vessel 30. In a first vertical position, i.e., with the plates 46 out of contact with the surface 13 of the solder 12, the cutting unit 40 executes a predetermined number of programmed cutting strokes, i.e., linear movements (arrow 44) relative to the separating vessel 30, such that the dross is separated into solder and a residue. This residue, which is substantially powder and has a low specific weight, will float on top of the solder 12. The cutting unit 40 and/or the plates 46 are then lowered into a second vertical position relative to the separating vessel 30, such that the plates 46 come into contact with the surface 13 of the solder, and the support is again displaced linearly in the direction of arrow 44 causing the plates 46 to skim the powder residue on the surface 13 of the solder 12 such that it may be vacuumed from the surface 13 by the suction apparatus 50.

In some cases, such as when lead-free solder is used in the soldering process, metal oxides that are produced as a byproduct of the soldering process may cool down relatively quickly and, as a consequence, may end up interfering with the operation of the cutting unit 40. To improve the separation of the dross into solder and residue and to inhibit interference with the operation of the cutting unit 40, a gas, such as nitrogen, can be injected into the separation vessel 30 (e.g., at a flow rate of between about 2 liters per minute and about 8 liters per minute) via the gas injection circuit 70. As gas is injected into the separating vessel 30, the apertures 83 allow the gas to exit the gas injection pipes 82 as bubbles 84 into the dross located in the separating vessel 30. The gas bubbles 84 explode as they rise to the surface 13 of the solder 12 thereby causing a reactionary force in the dross that can aid in the separation of the oxide layer from the solder, and, as a consequence, can help to inhibit or prevent interferences with the operation of the cutting unit 40 that may otherwise result.

Other Embodiments

While certain embodiments have been described above, other embodiments are possible. For example, while the gas injection circuit described above includes a pair of flow paths (e.g., active and bypass flow paths), each including a separate valve, in some embodiments, the gas injection circuit can alternatively or additionally include a single three-way valve connected between the flow regulators and the pressure regulator to control the flow of gas from the pressure regulator to the active and bypass flow regulators.

Alternatively, rather than including two separate flow paths, a single flow path can connect the pressure regulator to the gas injection assembly. The single flow path can include a flow meter and an adjustable valve for controlling the flow of gas to the gas injection assembly.

While the wave soldering system described above includes separate soldering and separating vessels, other embodiments may include a single vessel with a gas injection circuit.

Other details and features combinable with those described herein may be found in the following U.S. Pat. No. 6,578,752, entitled "Method and Apparatus for Separating Dross Floating on Solder," the entire contents of the which are hereby incorporated by reference.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
    delivering a molten combination of a first volume of solder and a second volume of dross into a first vessel, the second volume of the dross including a mixture of a third volume of the solder and a fourth volume of one or more oxides of the solder, the second volume of the dross floating on a surface of the first volume of the solder;
    cutting through the second volume of the dross that is floating on the surface of the first volume of the solder; and
    separating the second volume of the dross into the third volume of the solder and the fourth volume of the one or more oxides of the solder such that the second and third volumes are separated from each other by injecting a gas into the first volume of the solder below the second volume of the dross in the first vessel,
    wherein the gas is injected into the first volume of the solder via a multiplicity of apertures distributed in a lengthwise direction along a plurality of stationary pipes that are submerged in the first volume of the solder below the second volume of the dross.

2. The method of claim 1, wherein the gas is insert gas.

3. The method of claim 1, further comprising delivering the first volume of the solder and the third volume of the solder that was separated from the fourth volume of the one or more oxides of the solder the first vessel to a second vessel.

4. A method comprising:
    cutting a first volume of dross that is floating on a surface of a second volume of molten solder in a vessel by moving a plurality of knives back and forth through the first volume of dross and into the second volume of molten solder, the first volume of the dross including a third volume of the solder and a fourth volume of one or more oxides of the solder with the third and fourth volumes mixed together in the first volume of the dross; and
    separating the third volume of the solder from the fourth volume of the one or more oxides of the solder in the first volume of the dross by injecting gas into the second volume of the molten solder while the knives are moving back and forth through the first volume of the dross in a manner that forms gas bubbles which rise to and erupt at the surface of the second volume of the molten solder on which the first volume of the dross is floating.

5. The method as recited in claim 4, wherein the knives are moved linearly back and forth in parallel planes and the gas is injected in spaces between the parallel planes.

6. The method as recited in claim 4, further comprising skimming the fourth volume of the one or more oxides of the solder on the surface of the second volume of the molten solder in by moving a plate through at least a portion of the first volume of the dross.

7. The method as recited in claim 6, further comprising sucking the fourth volume of the one or more oxides of the solder that is skimmed from the surface of the second volume of the molten solder.

8. The method as recited in claim 6, wherein the knives and the plate are connected and move together.

9. The method as recited in claim 6, wherein the knives and the plate are parts of a unit that is vertically displaceable between first and second vertical positions, and further comprising:
    lifting the plate being out of contact with the surface of the second volume of the molten solder when the unit is in the first vertical position such that the knives are at least partially submerged in the second volume of the molten solder; and
    lowering the plate into contact with the surface of the second volume of molten solder when the unit is in the first vertical position such that the knives enter into and are at least partially submerged in the second volume of the molten solder.

10. The method as recited in claim 4, wherein the gas is inert gas.

11. The method as recited in claim 4, wherein at least some of the injected gas is injected at a plurality of apertures spaced along a pipe that is submerged in the second volume of the molten solder held in the vessel.

12. A method comprising:
    generating at least one soldering wave in a first volume of molten solder in a soldering vessel;
    moving a printed circuit board into contact with the at least one soldering wave, wherein a second volume of dross is formed and floats on a surface of the first volume of the molten solder responsive to the printed circuit board being moved into contact with the at least one soldering wave, the second volume of the dross including a third volume of the solder and a fourth volume of one or more oxides of the solder mixed together;
    moving the first volume of the molten solder and the second volume of the dross floating on the first volume of the molten solder from the soldering vessel into a separating vessel;
    cutting the second volume of the dross that is floating on the surface of the first volume of the molten solder in the separating vessel by moving a plurality of knives back and forth through the second volume of the dross and at least partially into the first volume of the molten solder;
    separating the third volume of the solder from the fourth volume of the one or more oxides of the solder in the second volume of the dross by injecting gas into the first volume of the molten solder in a manner that forms gas bubbles which rise to and erupt at the surface of the first volume of the molten solder on which the second volume of the dross is floating while the plurality of knives move back and forth across the surface of the first volume of the molten solder;
    skimming the fourth volume of the one or more oxides of the solder from the surface of the first volume of the molten solder by moving a plate across the surface of the first volume of the molten, solder;
    removing the fourth volume of the one or more oxides of the solder that is skimmed from the surface of the first volume of the molten solder in the separating vessel; and
    returning the first volume of the molten solder and the third volume of the solder that previously was part of the second volume of the dross from the separating vessel back to the soldering vessel.

13. The method as recited in claim 12, wherein the knives are moved linearly back and forth in parallel planes and the gas is injected in spaces between the parallel planes.

14. The method as recited in claim 12, wherein the knives and the plate are connected and move together.

15. The method as recited in claim 12, wherein the knives and the plate are parts of a unit that is vertically displaceable between first and second vertical positions, and further comprising:
    lifting the plate being out of contact with the surface of the first volume of the molten solder while the knives extend through the second volume of the dross and are at least partially submerged in the first volume of the molten solder when the unit is in the first vertical position; and
    lowering the plate into contact with the surface of the first volume of the molten solder while the knives extend through the second volume of the dross and are at least partially submerged in the first volume of the molten solder when the unit is in the second vertical position.

16. The method of claim 1, wherein the molten combination of the first volume of the solder and the second volume of the dross is delivered into the first vessel from a second vessel where part of the first volume of the solder was placed into contact with one or more objects to solder the objects and thereby forming the second volume of the dross, and further comprising:
    removing at least part of the third volume of the solder from the second volume of the dross; and
    returning the at least part of the third volume of the solder that is removed from the second volume of the dross to the second vessel where the at least part of the third volume of the solder is placed into contact with one or additional objects to solder the one or more additional objects.

17. The method of claim 16, further comprising soldering one or more additional objects in the second vessel with the at least part of the third volume of the solder that is removed from the second volume of the dross and returned to the second vessel.

18. The method of claim 4, further comprising:
    receiving the first volume of the dross and the second volume of the molten solder into a separating vessel from a soldering vessel;
    removing the fourth volume of the one or more oxides of the solder from the separating vessel; and
    returning at least part of the third volume of the solder that is separated from the second volume of the dross to the soldering vessel.

19. The method of claim 18, further comprising soldering one or more objects with the at least part of the third volume of the solder that is separated from the second volume of the dross and returned to the soldering vessel.

20. The method of claim 12, further comprising soldering one or more objects with at least part of the third volume of the solder that was separated from the second volume of the dross and returned to the soldering vessel.

21. The method of claim 20, wherein the one or more objects are soldered with the at least part of the third volume of the solder in the soldering vessel.

* * * * *